United States Patent
Moose et al.

(10) Patent No.: US 10,145,407 B2
(45) Date of Patent: Dec. 4, 2018

(54) WAVE WASHER, METHOD OF MANUFACTURE, METHOD OF USE, AND PIPE JOINT USING SAME

(71) Applicant: Crane Resistoflex, Marion, NC (US)

(72) Inventors: Matthew Moose, Marion, NC (US); Christopher Hock, Marion, NC (US); Ron Moffitt, Marion, NC (US); Landon Grindstaff, Marion, NC (US); Dan Rink, Marion, NC (US); Jesse Satterfield, Marion, NC (US); David Yanik, Marion, NC (US)

(73) Assignee: CRANE RESISTOFLEX, Marion, NC (US)

( * ) Notice: Subject to any disclaimer, the term of this patent is extended or adjusted under 35 U.S.C. 154(b) by 425 days.

(21) Appl. No.: 13/836,490

(22) Filed: Mar. 15, 2013

(65) Prior Publication Data

US 2014/0265325 A1   Sep. 18, 2014

(51) Int. Cl.
*F16L 17/00*   (2006.01)
*F16B 43/00*   (2006.01)
*F16L 23/036*   (2006.01)
*F16L 23/00*   (2006.01)
*F16L 23/20*   (2006.01)

(52) U.S. Cl.
CPC ............ *F16B 43/00* (2013.01); *F16L 23/006* (2013.01); *F16L 23/036* (2013.01); *F16L 23/20* (2013.01); *Y10T 29/49948* (2015.01)

(58) Field of Classification Search
USPC ................ 285/368, 412; 411/531; 29/525.02
See application file for complete search history.

(56) References Cited

U.S. PATENT DOCUMENTS

| | | | | |
|---|---|---|---|---|
| 1,942,704 A | * | 1/1934 | Hubbard | F16J 15/125 277/601 |
| 3,656,769 A | * | 4/1972 | Jelinek | F16L 23/20 277/611 |
| 4,002,344 A | * | 1/1977 | Smith | F16J 15/061 277/609 |
| 4,095,809 A | | 6/1978 | Smith | |
| 4,627,207 A | * | 12/1986 | Young | E04D 5/145 411/531 |

(Continued)

OTHER PUBLICATIONS

"High Integrity Flange: The Environment Demands It", Crane Resistoflex, pp. 1-25.

*Primary Examiner* — Aaron M Dunwoody
(74) *Attorney, Agent, or Firm* — Fitzpatrick, Cella, Harper & Scinto

(57) ABSTRACT

A wave washer includes an annular member surrounding an opening arranged to receive a pipe axially therethrough, the annular member having a plurality circumferentially spaced holes formed therein. The wave washer also has associated with it at least one spring portion protruding axially from the annular member between two of the holes. The wave washer can be used in a pipe joint to join a first pipe and a second pipe, each having a pipe end having a pipe flange and an adjacent sealing flange. The wave washer is positioned against an inner side of the pipe flange of the first pipe. The wave washer and the flanges of the first and second pipes are fastened based on the deflection of the annular member of the wave washer.

17 Claims, 8 Drawing Sheets

(56) References Cited

U.S. PATENT DOCUMENTS

| | | | | |
|---|---|---|---|---|
| 5,785,322 A | * | 7/1998 | Suggs | F16L 23/18 |
| | | | | 277/591 |
| 6,361,257 B1 | | 3/2002 | Grant | |
| 6,669,184 B2 | | 12/2003 | Cai et al. | |
| 6,682,081 B2 | * | 1/2004 | Burton | F16L 23/22 |
| | | | | 277/602 |
| 6,948,717 B1 | | 9/2005 | Carr | |
| 8,191,933 B2 | * | 6/2012 | Rao | F16J 15/104 |
| | | | | 277/608 |
| 9,206,902 B2 | * | 12/2015 | Strydom | F16J 15/127 |

* cited by examiner

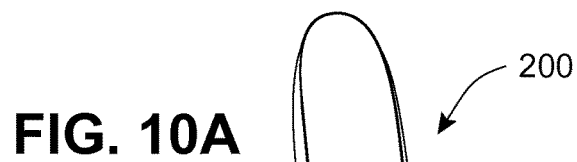
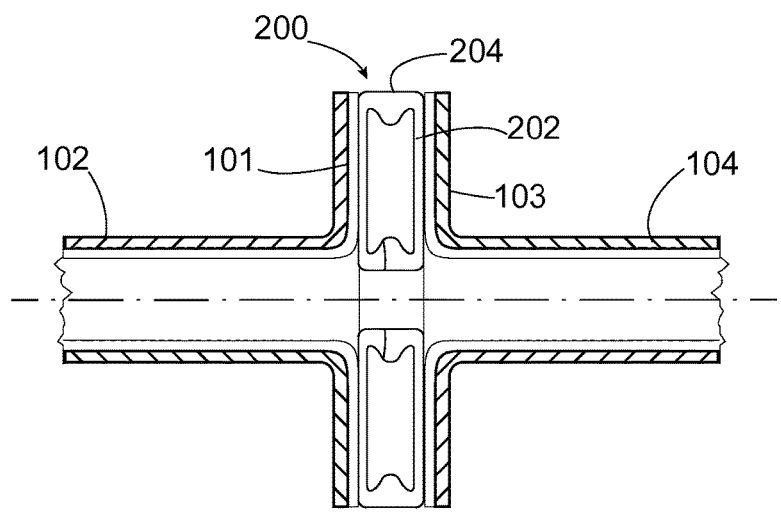
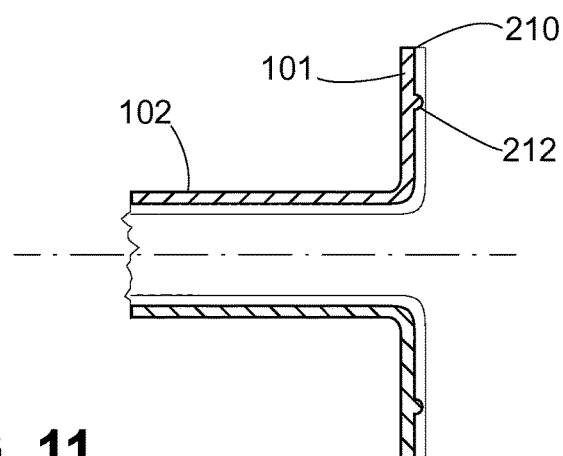

us 10,145,407 B2

WAVE WASHER, METHOD OF MANUFACTURE, METHOD OF USE, AND PIPE JOINT USING SAME

BACKGROUND OF THE INVENTION

Field of the Invention

The following disclosure relates to a joint member for pipe joints and in particular, to a wave washer for pipe flange joints.

Conventional piping systems that include plastic lined piping that employ plastic seals, integral to the liner at the flange joints, have been known to leak as a result of thermal cycling and/or extended use. For example, some piping systems are constructed with pipes lined with polytetrafluoroethylene (PTFE) that flares around a sealing flange. Each pipe has a sealing flange which may or may not be separate from the pipe flange. Other industry terms for a sealing flange may include, but are not limited to, flared lap, raised face, and flange face. These terms are variously used to describe flange systems comprised of fixed (welded) flange or movable (i.e., rotatable) pipe flanges. The pipe flanges of connected pipes are connected to each other by a plurality of flange bolts, nuts, and washers, which, when set to a predetermined torque, apply a force to the sealing flanges to seal them together. Plastic, either in the form of the flared end of the pipe, is positioned between the sealing flanges so that the fluid in the pipe contacts only plastic.

However, under thermal cycling and/or after extended use, the plastic between the sealing flanges may experience a cold flow condition (mechanical creep) and thin out in the vicinity of the sealing surface, thereby loosening the joint. As a result of the cold flow, the initial torque (i.e., load) on the flange bolts of the joint may be insufficient to maintain a fluid tight seal between the sealing flanges. Typically, to mitigate the effects on the pipe joint owing to such a cold-flow condition, the flange bolts holding the PTFE flange joint together are re-torqued at least once while in service. Such re-torquing of the flange bolts requires periodic monitoring and is labor intensive and costly to do, especially where the piping installation includes multiple PTFE flange joints or where joints are not easily accessed.

Therefore, a need exists for a leak- and maintenance-free pipe joint connection that is cost effective and requires less maintenance than conventional PTFE-lined flange joints.

SUMMARY

In a first aspect of the present inventors' work a wave washer is described comprising an annular member surrounding an opening arranged to receive a pipe axially therethrough, the annular member having a plurality of circumferentially spaced holes formed therein. The wave washer also has associated with it at least one spring-portion, which is most preferably formed as a protrusion protruding axially from the annular member between two of the holes.

In a second aspect of the present inventors' work, a method of joining a first pipe to a second pipe is described. Each of the pipes has a pipe end having a pipe flange and an adjacent sealing flange. The sealing flange is on an outer side of the pipe flange and the sealing flange is lined with a plastic material. A wave washer is positioned against an inner side of the pipe flange of the first pipe. The wave washer comprises an annular member surrounding an opening arranged to receive the first pipe axially therethrough. The annular member has a plurality of circumferentially spaced holes formed therein, and has associated with it at least one spring-portion preferably formed as a protrusion protruding axially from the annular member between two of the holes. These holes of the wave washer are aligned with a plurality of mating holes formed in the pipe flanges of the first pipe and the second pipe. Flange bolts are inserted through the respective aligned holes of the wave washer and the pipe flanges of the first pipe and the second pipe, and a nut is threaded onto each of the flange bolts. The flange bolts are torqued to a predetermined torque based on the full deflection of the annular member of the wave washer.

In a third aspect of the present inventors' work, a pipe joint joining a first pipe to a second pipe is described. Each of the pipes has a pipe end having a pipe flange and an adjacent sealing flange. The sealing flange is on an outer side of the pipe flange and the sealing flange is lined with a plastic material. The pipe joint includes a wave washer positioned against an inner side of the pipe flange of the first pipe. The wave washer comprises an annular member surrounding an opening arranged to receive the first pipe axially therethrough, the annular member having a plurality of circumferentially spaced holes formed therein, and having associated with it at least one spring-portion preferably formed as a protrusion protruding axially from the annular member between two of the holes. The pipe joint also includes flange bolts inserted through the holes of the wave washer and aligned holes of the pipe flanges of the first pipe and the second pipe. Also, the pipe joint includes nuts threaded onto the respective flange bolts. The flange bolts are torqued to a predetermined torque based on the deflection of the annular member of the wave washer.

BRIEF DESCRIPTION OF THE DRAWINGS

The structures, articles and methods claimed and/or described herein are further described in terms of exemplary embodiments. These exemplary embodiments are described in detail with reference to the drawings. These embodiments are non-limiting exemplary embodiments, wherein:

FIG. 10A shows an embodiment of a pressure-assisted gasket in accordance with an other aspect of the invention;

FIG. 10B shows a schematic of a portion of a pipe joint employing the pressure-assisted gasket of FIG. 10A; and FIG. 11 shows a section view of a portion of a pipe and sealing flange in accordance with another aspect of the invention.

DETAILED DESCRIPTION

Those of ordinary skill in the art will realize in view of this description that the following detailed description of the exemplary embodiments is illustrative only and is not in any way limiting. Other embodiments will readily suggest themselves to such skilled persons having the benefit of this disclosure. Reference will now be made in detail to implementations of the exemplary embodiments as illustrated in the accompanying drawings. The same reference numbers will be used throughout the drawings and the following detailed description to refer to the same or like parts.

Figure 1:
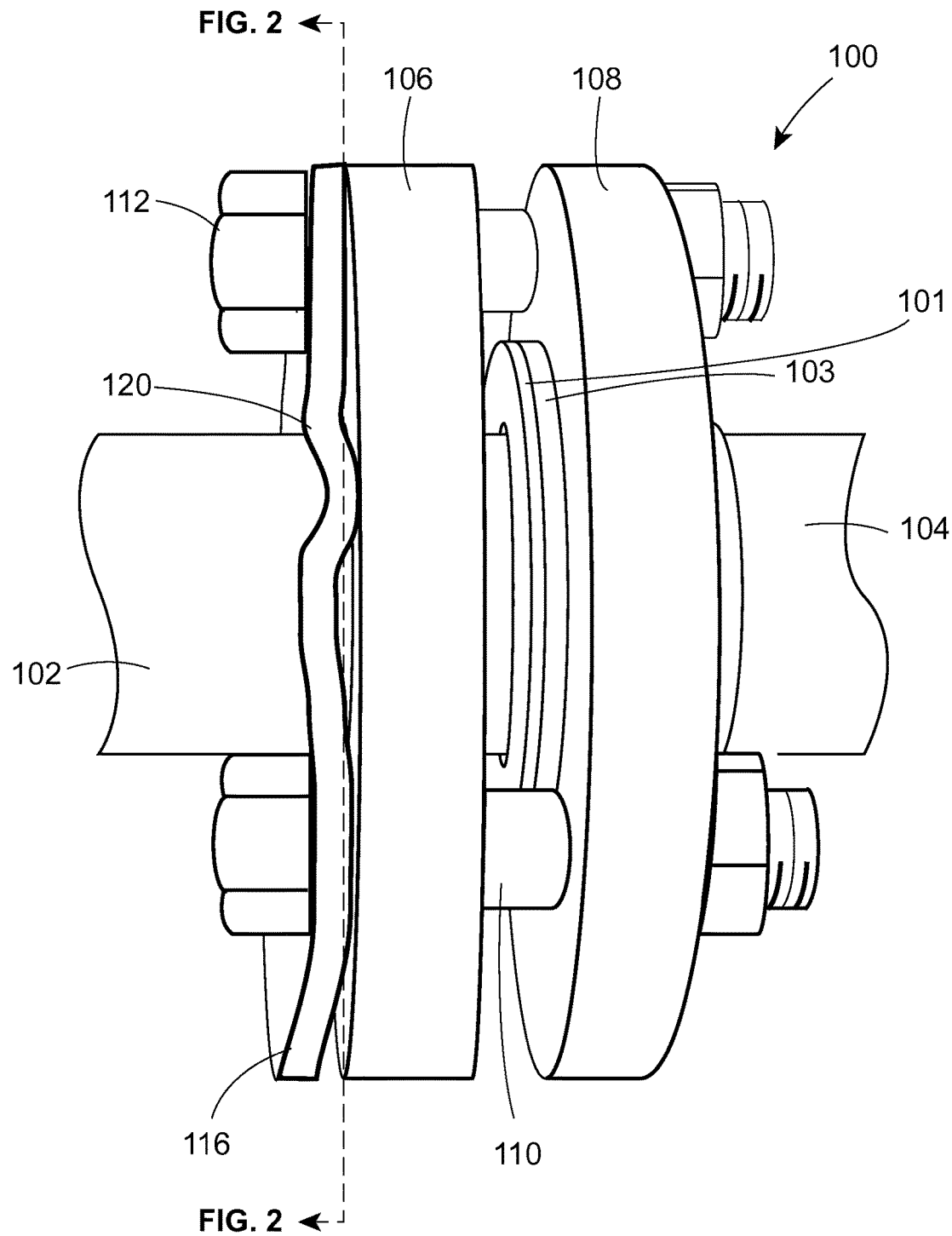
FIG. 1 shows a side elevation view of a flange joint in accordance with an aspect of the invention.

FIG. 1 shows an elevation view of a PTFE flange joint 100 connecting two pipes 102 together. The construction of the pipes 102, 104 and flanges 106, 108 at the end of the pipes are known in the art as described above. The joint 100 is held together by fasteners including flange bolts 110 and nuts 112. In addition to the above-mentioned flange joint components, a wave washer 116 is interposed between the bolt head and flange 106.

The wave washer 116 is generally annular and has a plurality of holes 118 (FIG. 2) that permit the flange bolts 110 to pass therethrough. The wave washer 116 has at least one spring-portion, shown formed as a protrusion 120 that extends toward flange 106. In this embodiment the protrusion could be described as being "wave-shaped", in that the washer has a shape that appears to undulate. When the flange bolts 110 are torqued to a predetermined value, the wave washer 116 elastically deforms (as shown in FIG. 1) near its outer edge about the protrusion 120 like a beam, thereby applying a live load to the flange bolts 110 by virtue of a reaction moment acting on the wave washer 116. By virtue of the live load on the flange bolts 110, if the plastic at the sealing surface cold flows, the reaction forces exerted by the wave washer 116 on the flange bolts 110 can tend to compensate for the loss in load on the flange bolts 110, so that sealing pressure is maintained at or above sufficient levels to prevent leakage of fluid between the sealing flanges 101, 103.

Figure 2:
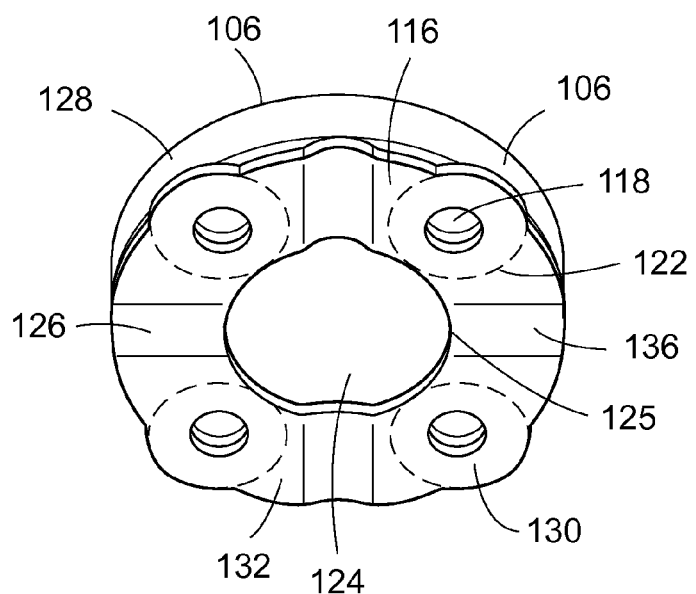
FIG. 2 shows a section view of the flange joint along line 2-2 in FIG. 1.
Figure 3:
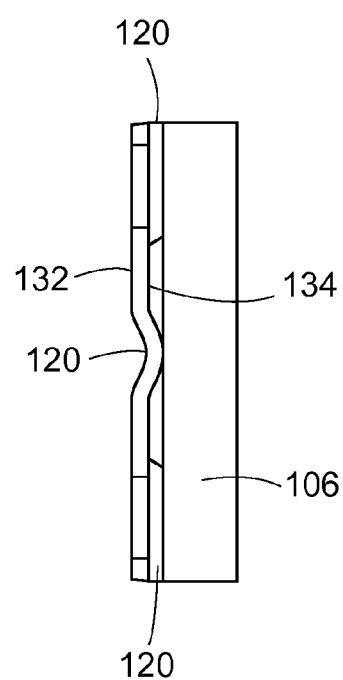
FIG. 3 shows a side elevation view of a portion of the flange joint shown in FIG. 1.
Figure 4:
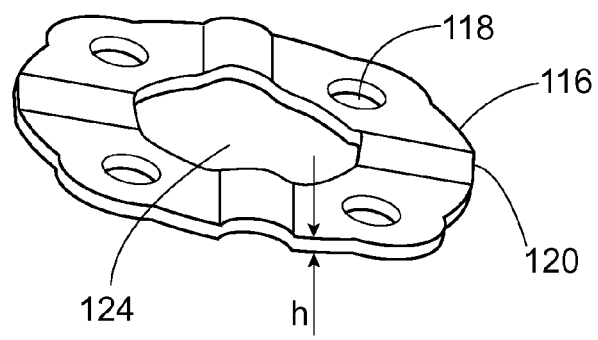
FIG. 4 shows an isometric view of a wave washer in accordance with an aspect of the invention.

The construction of the wave washer 116 according to one embodiment will now be described with reference to an example shown in FIGS. 2 to 5, which illustrates an arrangement of the wave washer 116 where the pipe flanges 106 and 108 are arranged for pipe having a nominal size of 2 inches. The wave washer 116 includes a generally annular member 122 surrounding an opening 124 to receive pipe 102. The wave washer 116 may be generally of the same size (as measured by its outer edge) as is the flange 106, as measured by the outer edge of the latter. As shown in FIG. 2, the outer edge of the wave washer has a larger diameter near the holes 118, forming flanges 130 around holes 118. The flanges 130 spread the force from the nut 112 and/or an optional washer (not shown). Flange 116 is shown having four through-holes. Of course, flange 116 may have other numbers of holes 118, e.g., for other nominal sizes of pipe.

Figure 5:
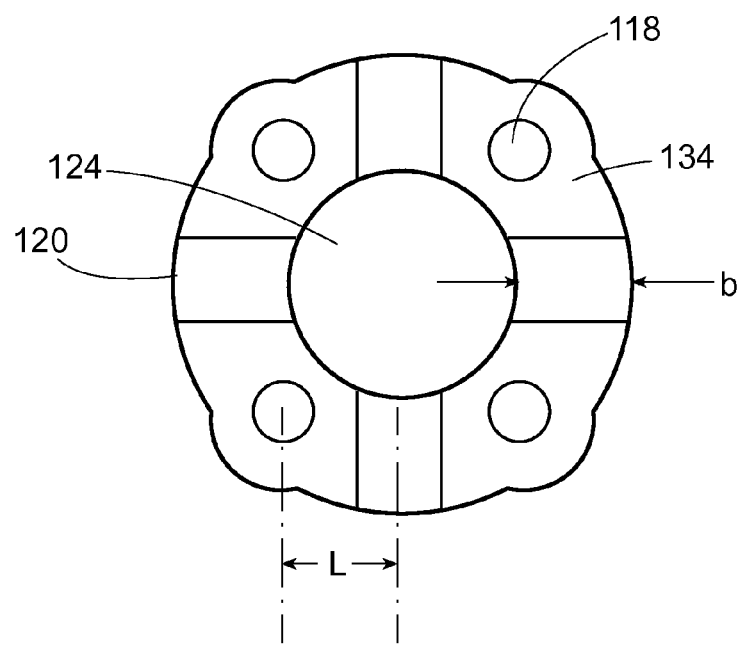
FIG. 5 shows a plan view of the wave washer shown in FIG. 4.

The wave washer 116 has a front side 132 (shown most clearly in FIG. 2) and a rear side 134 (shown mostly clearly in FIG. 5). The rear side 134 faces flange 106. As shown most clearly in FIG. 3, spring-portions formed as protrusions 120 extend axially from the rear side of the wave washer 116 towards the flange 106. The axial length of the protrusions 120 depends in part on the expected deflection of the annular member 122 when the wave washer 116 is installed and the flange bolts 110 are torqued. The wave washer 116 is constructed so that the deflection of the annular member 122 is sufficient to compensate for the loss in load on the flange bolts 110 resulting from the cold flow condition. Moreover, the washer 116 is constructed so that when the annular member 122 is deflected, the washer 116 transfers a sufficient load to maintain sealing pressure in the pipe joint throughout the range of deflection of the wave washer 116.

For the embodiment shown in FIGS. 2 to 5, the protrusions 120 are formed as curved rises or bends in the rear side 134 of the annular member 122 of the washer 116 between the through-holes 118, each rise or bend extending across the width of the washer radially from the inner circumference to the outer circumference. In the embodiment shown in FIGS. 2 to 5, the protrusions 120 extend substantially perpendicular to each other in a cross pattern extending into the spaces between holes 118, which are equally spaced from each other circumferentially. On the front side 132 of the washer 116, curved depressions or indentations 136 are visible at the same locations as the rises on the rear side 134. In one embodiment, the curved indentations 136 and protrusions 120 are semicircular, in the sense of having a curved surface facing flange 106 and the curved surface having a cross-section shaped like a circular arc. In another embodiment, the protrusion 120 of the wave washer 116 is formed as a crease having generally planar rises joined at an apex. The angle between the planar rises can be acute or obtuse. In yet other embodiments of the wave washer 116, the front side 132 may not have any indentations collinear with the protrusions 120 and, instead, may be flat, for example. Thus, while this illustrated embodiment of the wave washer 116 has a uniform thickness of material all the way around its circumference, both in the flatter portions and in the rises, other embodiments may have variations in thickness.

The wave washer may be made from carbon steel or other metals suitable to meet the predetermined load/deflection requirements for the flange joint. For the sake of completeness, the following example is provided to describe how the maximum deflection of the annular member is determined when the flange bolts are loaded. The wave washer 116 can be formed by various metal-forming techniques, including stamping, forging, machining, rolling, and casting.

Figure 6:
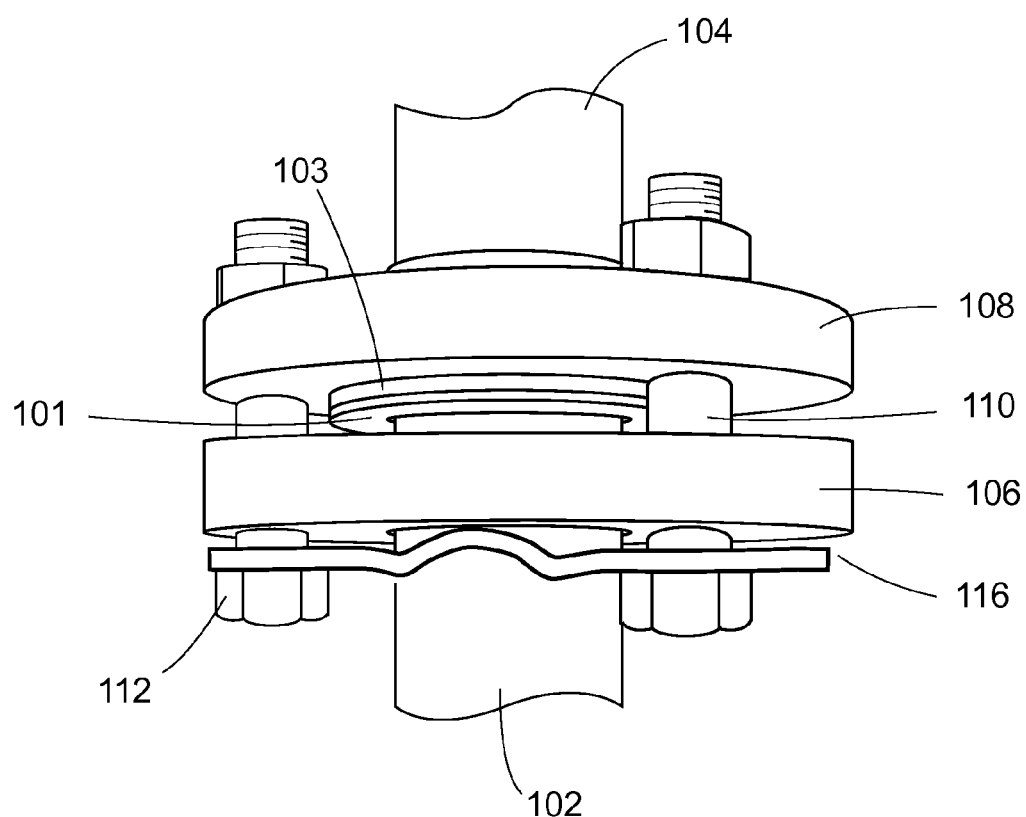
FIG. 6 shows the wave washer positioned in the pipe joint of FIG. 1 before the washer is compressed by the pipe flanges.

FIG. 6 shows a view of the flange joint 100 of FIG. 1, in a partially assembled state where wave washer 116 has not been deflected by the flange bolts. As shown in FIG. 6, the flanges 130 of the washer 116 are flush with the bolt heads and the protrusion 120 contacts the pipe flange 106.

The features of the wave washer 116 will now be described with reference to a specific dimensioned example, which is described merely by way of example and not limitation. For the example in FIGS. 2 to 5, the annular member 122 has a thickness h (FIG. 4) from the front side 132 to the rear side 134 of 0.190 inch and has a width b (FIG. 5) between the outer edge and inner edge of 2.581 inches. The distance L (FIG. 5) from the center of one of the protrusions 120 to the center of an adjacent bolt hole 118 in the annular member 122 of the wave washer 116 is 1.866 inch. In one example the wave washer 116 is made from ANSI grade C6 tool steel having an elastic modulus E of $28 \times 10^6$ pounds per square inch. As discussed above, the example wave washer 116 is used in a pipe joint having a nominal pipe diameter of two inches. For a two-inch pipe using bolted flanges, the maximum bolt stress on each bolt 110 is assumed to be 30,960 pounds per square inch and the maximum torque applied to each of the bolts 110 is 65 foot-pounds. The sealing flanges 101 and 103 each have a sealing area of 4.998 square inches. Therefore, the total bolt stress on the sealing surface is about 123,840 pounds per square inch and the force from a single bolt of the four bolts is about 6,194 pounds force. As a result of the force applied by each bolt 110, a moment is exerted at the center of each protrusion 120 of about 963 foot-pounds. The deflection of the annular member 122 of the wave washer 116 can be modeled as a cantilevered beam having a rectangular cross-section whose moment of inertia I is represented by the equation:

$$I = \frac{bh^3}{12},$$

where b (FIG. 5) is the radial width of the annular member 122 and h is the thickness of the annular member 122, as discussed above. Of course, as will be appreciated by those of ordinary skill in the art, the moment of inertia I for wave washers having different cross-sectional geometries may be different. For the example dimensions discussed herein for wave washer 116, the moment of inertia I is about $1.47 \times 10^{-3}$ in$^4$. With the moment of inertia I calculated, the maximum deflection $V_{max}$ can be determined from the equation:

$$V_{max} = \frac{PL^3}{3EI},$$

where P represents the force applied to the washer 116 from a single bolt 110, and L represents the linear distance (FIG. 5) between the center of the protrusion 120 and the center of the bolt hole 118, as discussed above. For the example, wave washer $V_{max}$ is 0.325 inch. Therefore, based on the example wave washer, it is expected that the annular member of the wave washer will deflect 0.325 inch axially toward the flange 106 at the radial location of the bolt holes 118. As will be appreciated by those of skill in the art, changes to the material composition of the wave washer 116 and its dimensions may affect the deflection of the wave washer 116.

Moreover, the force exerted by the washer 118 on the bolts 110 can be determined from the following two equations:

$$K = \frac{3EI}{l^3}, \text{ and } F = Kd,$$

where K represents a spring rate and l represents the cantilevered length from the center of the protrusion 120 to the center of the bolt hole 118 and d represents the arc deflection of the wave washer annular member 122. Given the values in the example above, the spring rate K would be about 19,073 pound feet per inch. Thus, for an arc deflection d of 0.100 inch, the load exerted by the wave washer 116 would be about 1907 pounds force.

While the present disclosure has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

Figure 7A:
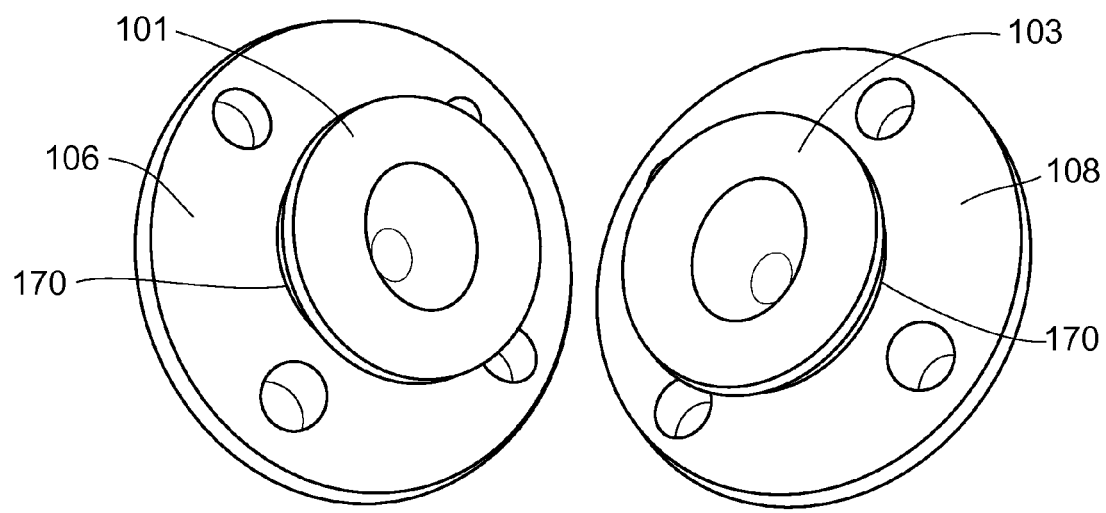
FIG. 7A shows another embodiment of a portion of a flange joint in accordance with an aspect of the invention.
Figure 7B:
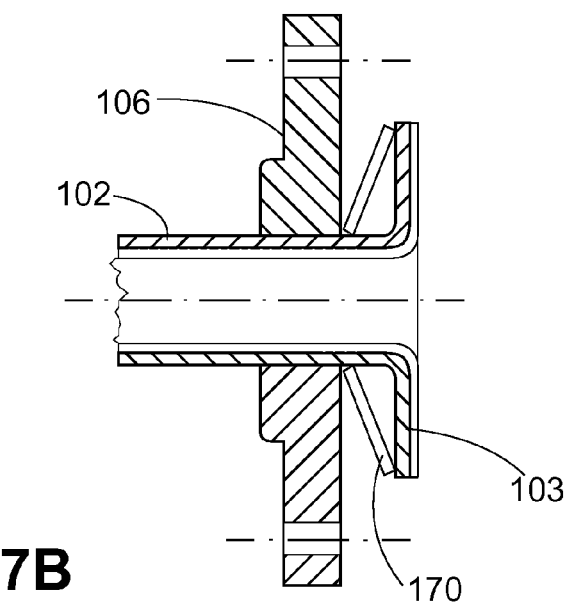
FIG. 7B shows a section view of a portion of the flange joint shown in FIG. 7A along line 7B-7B in FIG. 7A.

As an alternative to preferred embodiments presently described, part of a piping joint employing a Belleville spring 170 is shown in FIGS. 7A and 7B. In FIGS. 7A and 7B, a Belleville spring 170 is introduced between pipe flange 106 and sealing flange 101 and between pipe flange 108 and sealing flange 103. When the pipe flanges 106 and 108 are fastened as described above and the sealing flanges 101 and 103 are initially sealed, the flange bolts 110 are loaded to a predetermined value so that the Belleville springs 170 deflect a certain amount, axially compressing the sealing flanges 101 and 103. In the event that cold flow occurs at the sealing flanges 101 and 103, the load on the Belleville springs 170 will tend to force the sealing flanges 101 and 103 together to maintain a sealed connection.

Figure 8A:
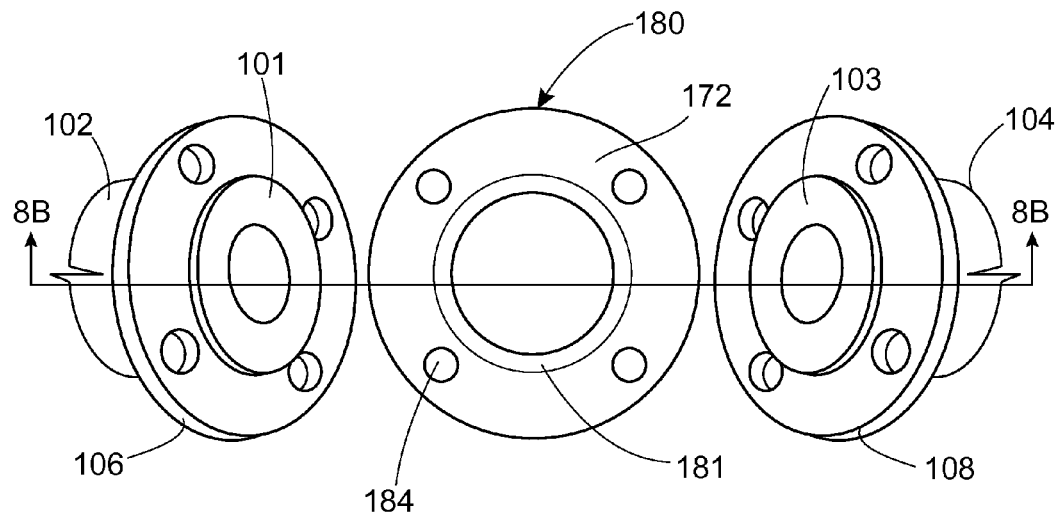
FIG. 8A shows another embodiment of a portion of a flange joint in accordance with an aspect of the invention.
Figure 8B:
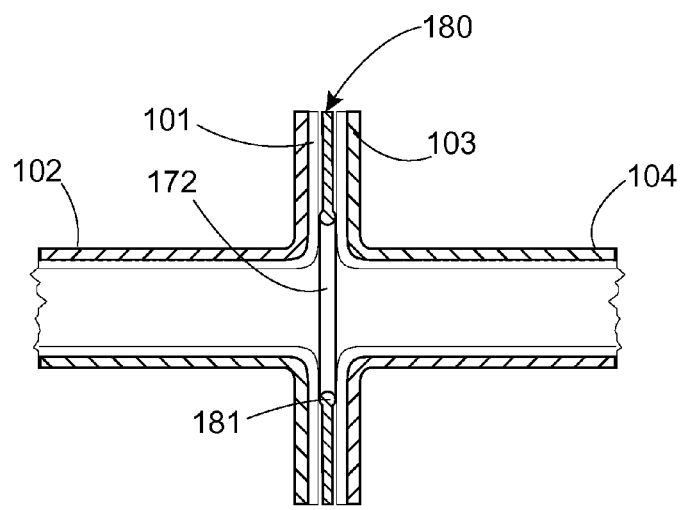
FIG. 8B shows a section view of a portion of the flange joint shown in FIG. 8A along line 8B-8B in FIG. 8A.

As another alternative to the preferred embodiments presently described above, a flange joint employing a high pressure o-ring 180 is shown in FIGS. 8A and 8B. The high-pressure o-ring 180 is introduced between the sealing flanges 101 and 103 of the pipes. The o-ring 180 includes semi-circular beads 181 applied to each side of an annular disk 182. The beads 181 are opposed to each other on the disk 182, such that in cross section (FIG. 8B) the two beads 181 taken together have a generally circular cross section. The disk 182 has holes 184 formed therein in a pattern that aligns with the holes in the pipe flanges 106 and 108. When the pipes 102 and 104 are assembled with the high-pressure o-ring 180 between the sealing flanges 101 and 103, as shown in FIG. 8B, flange bolts 110, like those in FIG. 1, can be introduced through the holes 184 in the disk 182 and the pipe flanges 106 and 108. The beads 181 are radially positioned so that they compress against a portion of the sealing flanges 101 and 103 when the flange bolts 110 are tightened. When the flange bolts 110 are loaded to a predetermined load the beads 181 of the high pressure o-ring 180 will compress a certain amount so that if cold flow occurs at the sealing flanges 101 and 103, the relaxation in the beads 181 will be sufficient to maintain a seal between the sealing flanges.

Figure 9A:
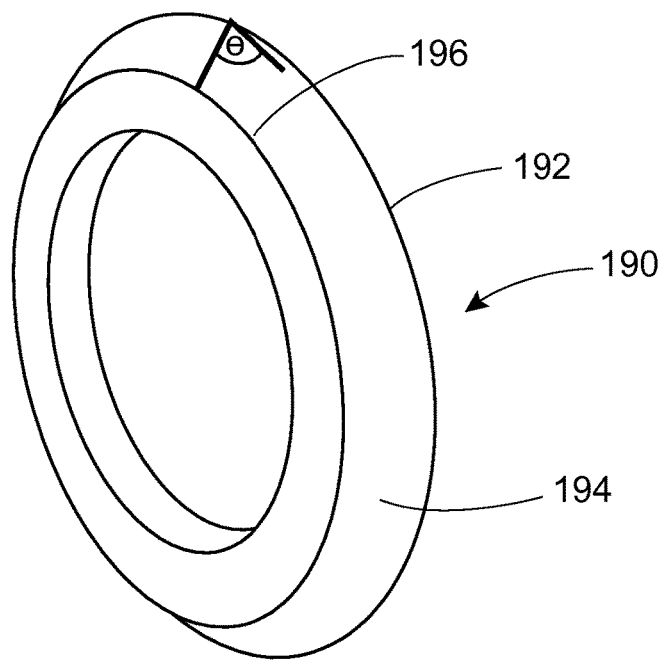
FIG. 9A shows an embodiment of a tapered gasket in accordance with another aspect of the invention.
Figure 9B:
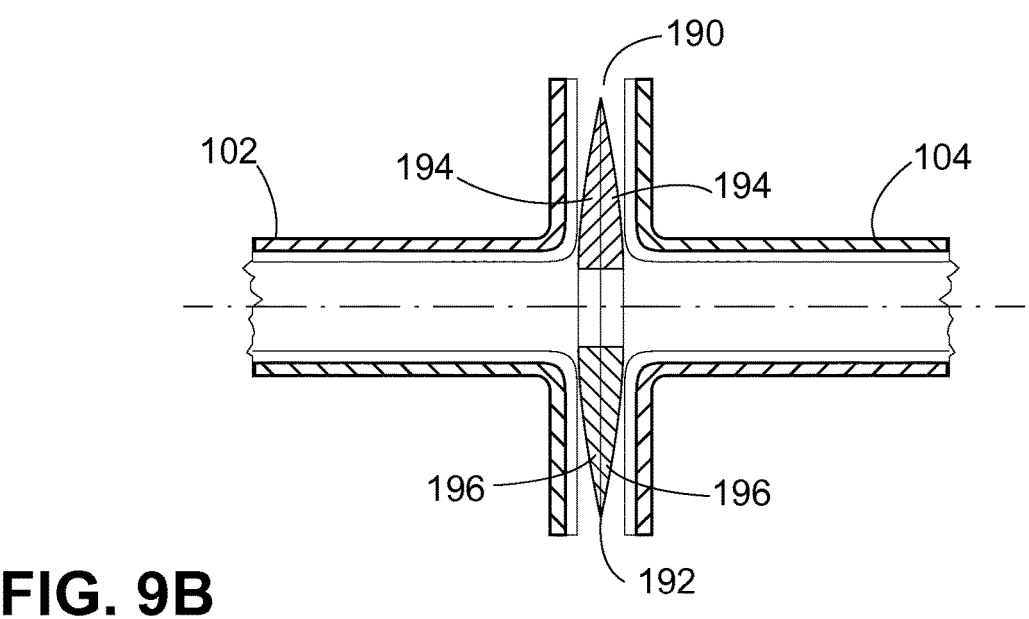
FIG. 9B shows a schematic of a portion of a pipe joint employing the tapered gasket of FIG. 9A.

As an alternate to the high-pressure o-ring, gaskets can be employed, such as a tapered gasket 190 shown in the embodiment in FIGS. 9A and 9B. The tapered gasket 190 has a central radial outer edge 192 from which extends a frustoconical surface 194 that tapers to side edge 196. When two gaskets 190 are placed side by side as shown in FIG. 9B and the gaskets 190 are compressed between the sealing flanges 101 and 103 as shown in FIG. 9B, the side edges 196 are squeezed toward each other and the central radial outer edge 192 is displaced radially outwardly. The taper angle 198 of the gasket 190 allows for the frustoconical surface 194 to deform in spring-like fashion to resiliently urge the gasket 190 against the sealing flanges 101 and 103. Thus, in the event of a cold-flow condition occurring at the sealing flanges 101 and 103, the tapered gasket 190 can relax to tend to maintain a seal between the sealing flanges.

As another alternate to the high-pressure o-ring, a pressure-assisted o-ring 200 is employed in the embodiment in FIGS. 10A and 10B. The pressure-assisted o-ring 200 is formed generally as an inner ring 202 surrounded by an outer ring 204, shown more clearly in FIG. 10B. The outer ring 204 is formed of a resilient material that is axially compressible. The inner ring 202 is formed of a resilient material which can be radially stretched in response to axial compression. When the sealing flanges 101 and 103 are urged together during assembly of the pipe joint, the outer ring 204 of the o-ring is axially compressed inwardly, causing the inner ring 202 to stretch radially outwardly. Owing to the resilient nature of the inner ring 202 and outer ring 204, if a cold flow condition occurs at the sealing flanges, compression on the outer ring 204 will be reduced and the inner ring 202 will be urged radially inwardly to thereby urge the outer ring 204 axially outwardly against the sealing flanges 101 and 103 so as to tend to maintain the seal between the sealing flanges.

In another embodiment shown in FIG. 11, sealing flange 101 is modified to incorporate an annular bead 212 formed on the flare face 210 on which the plastic lining is flared when forming the pipe. The annular bead 212 extends generally perpendicular from the flare face 210 and can be semicircular in cross-section. When the sealing flanges 101 and 103 are compressed together during assembly of the pipe joint, the annular bead 212 applies pressure to sealing flange 103, similar to the operation of high-pressure o-ring described above. In the event a cold flow condition develops at the sealing flanges 101 and 103, pressure from the annular bead 212 is applied against the sealing flange 103 to maintain the seal.

What is claimed is:

1. A pipe joint joining a first pipe to a second pipe, each of the pipes having, at an open end thereof, a sealing flange and an adjacent pipe flange, the pipe flange being on an inner side of the sealing flange opposite the open end, the pipe joint comprising:
    a wave washer positioned against a side of the pipe flange that is opposite the side facing the sealing flange of the first pipe, the wave washer comprising an annular member surrounding an opening arranged to receive the first pipe axially therethrough, the annular member having a plurality of circumferentially spaced holes formed therein, and having at least one spring portion protruding axially from the annular member between at least two of the holes;
    a plurality of fasteners introduced into the plurality of holes of the wave washer and mating holes formed in the pipe flanges of the first pipe and the second pipe, wherein the fasteners are subject to a load based on a deflection of the annular member of the wave washer.

2. The pipe joint according to claim 1, wherein the fasteners introduced include threaded fasteners including at least one of flange bolts and threaded rod.

3. The pipe joint according to claim 2, wherein when the fasteners include flange bolts, loading includes torquing the flange bolts to subject the flange bolts to a load based on the deflection of the annular member of the wave washer.

4. A pipe joint joining a first pipe to a second pipe, each of the pipes having, at an open end thereof, a sealing flange and an adjacent pipe flange, the pipe flange being on an inner side of the sealing flange opposite the open end, the pipe joint comprising:
    a spring washer element positioned against a side of the pipe flange, the spring washer element comprising an annular member surrounding an opening arranged to receive the first pipe axially therethrough, the annular member having a plurality of circumferentially spaced holes formed therein, and having at least two spring portions protruding from the annular member in a direction generally parallel to an axis of the pipes at the pipe joint; and
    a plurality of fasteners introduced into the plurality of holes of the spring washer element and mating holes formed in the pipe flanges of the first pipe and the second pipe, wherein the fasteners are subject to a load based on a deflection of the spring portions of the spring washer element.

5. The pipe joint according to claim 4, the spring portions being disposed to apply the spring force at locations radially inboard of, radially outboard of, and between the circumferentially spaced holes.

6. A pipe joint joining a first pipe to a second pipe, each of the pipes having, at an open end thereof, a sealing flange and an adjacent pipe flange, the pipe flange being on an inner side of the sealing flange opposite the open end, the pipe joint comprising:
    a spring washer element positioned against a side of the pipe flange, the spring washer element comprising an annular member surrounding an opening arranged to receive the first pipe axially therethrough, the annular member having a plurality of circumferentially spaced holes formed therein, and having at least one spring portion protruding from the annular member in a direction generally parallel to an axis of the pipes at the pipe joint; and
    a plurality of fasteners introduced into the plurality of holes of the spring washer element and mating holes formed in the pipe flanges of the first pipe and the second pipe, wherein the fasteners are subject to a load based on a deflection of the spring portion of the spring washer element.

7. The pipe joint according to claim 6, wherein the at least one spring portion extends from the washer or the pipe flange of the first pipe.

8. The pipe joint according to claim 6, wherein the at least one spring portion is formed as a protrusion in the annular member or the pipe flange of the first pipe, the protrusion protruding in a direction substantially perpendicular to the annular member and/or the pipe flange of the first pipe.

9. The pipe joint according to claim 8, wherein the protrusion is a curved surface, the curved surface being a circular arc in cross-sectional shape.

10. The pipe joint according to claim 8, wherein the protrusion is formed as at least one of a dimple and a crease.

11. The pipe joint according to claim 8, wherein the at least one spring portion is formed as a bend in the annular member.

12. The pipe joint according to claim 6, wherein the at least one spring portion is disposed between a pair of the holes in the annular member.

13. The pipe joint according to claim 6, wherein the fasteners introduced include threaded fasteners including at least one of flange bolts and threaded rod.

14. The pipe joint according to claim 13, wherein when the fasteners include flange bolts, loading includes torquing the flange bolts to subject the flange bolts to a load based on the deflection of the annular member of the washer.

15. A method of joining a first pipe to a second pipe, each of the pipes having, at an open end thereof, a sealing flange and an adjacent pipe flange, the pipe flange being on an inner side of the sealing flange opposite the open end, the method comprising:
    positioning a wave washer against a side of the pipe flange that is opposite the side facing the sealing flange of the first pipe, the wave washer comprising an annular member surrounding an opening arranged to receive the first pipe axially therethrough, the annular member having a plurality of circumferentially spaced holes formed therein, and having at least one spring portion protruding axially from the annular member between at least two of the holes;
    aligning the plurality of holes of the wave washer with a plurality of mating holes formed in the pipe flanges of the first pipe and the second pipe;

introducing fasteners through the respective aligned holes of the wave washer and the pipe flanges of the first pipe and the second pipe; and fastening the wave washer and the pipe flanges together by loading the fasteners based on a deflection of the annular member of the wave washer.

16. The method according to claim 15, wherein the fasteners introduced include threaded fasteners including at least one of flange bolts and threaded rod.

17. The method according to claim 16, wherein when the fasteners include flange bolts, loading includes torquing the flange bolts to subject the flange bolts to a load based on the deflection of the annular member of the wave washer.

\* \* \* \* \*